United States Patent Office 3,242,114
Patented Mar. 22, 1966

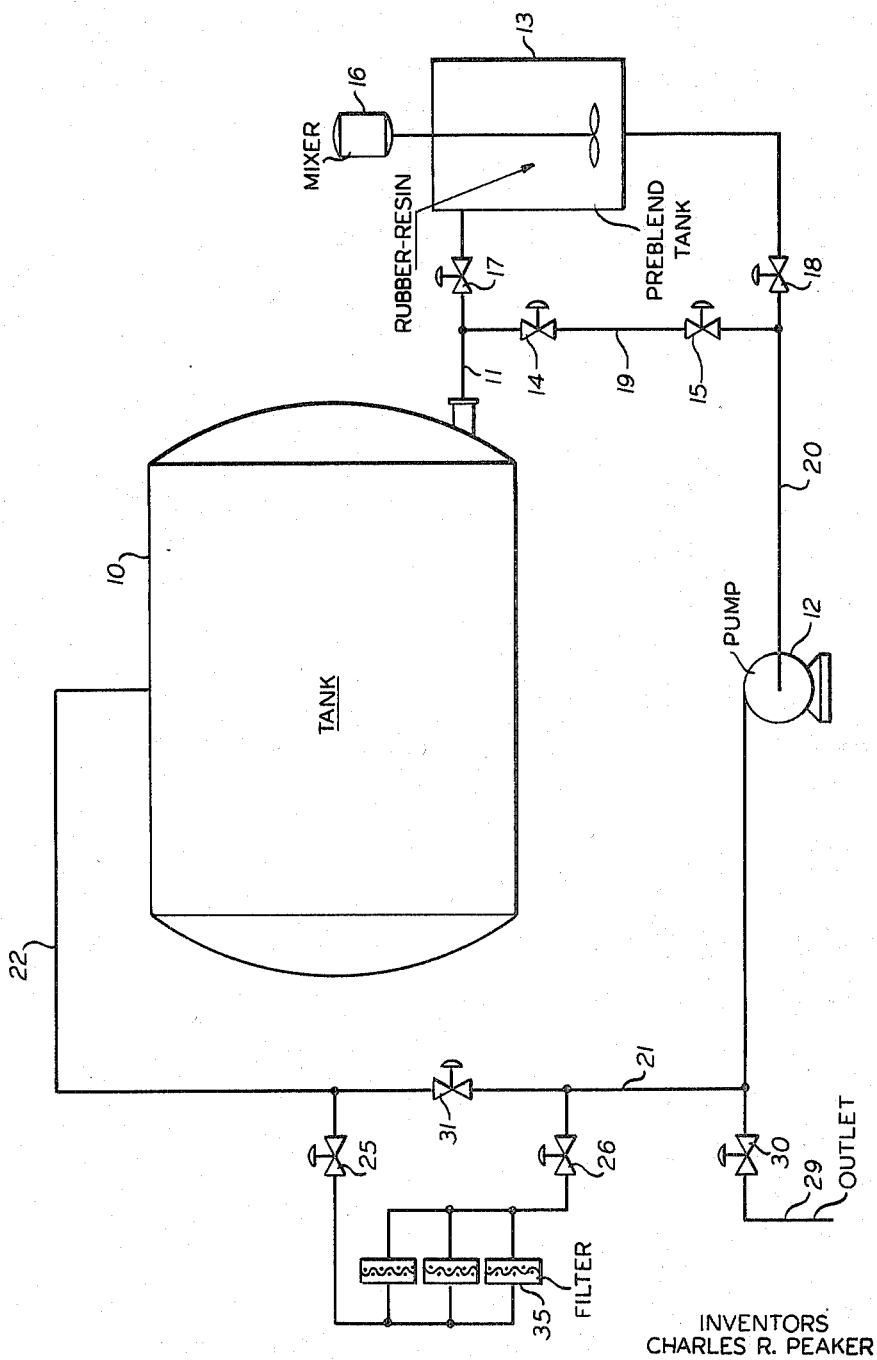

3,242,114
PROCESS FOR DISPERSING RUBBER
COMPOSITIONS IN ASPHALT
Charles R. Peaker and Carmine C. Di Maria, Naugatuck, Conn., assignors to United States Rubber Company, New York, N.Y., a corporation of New Jersey
Filed Aug. 28, 1961, Ser. No. 134,221
1 Claim. (Cl. 260—28.5)

This invention relates to a method of incorporating rubber in liquid petroleum base materials and to the compositions thereby achieved. More particularly, the invention relates to a method of dispersing rubber in liquid bituminous materials, such as asphalt.

Natural rubber and synthetic rubbers have been incorporated in the asphalt which is used in road surfacing, e.g., as the binder for the aggregate in paving constructions, and in other petroleum base products, generally in amounts from 1 to 20 parts per 100 parts of the asphalt, to improve low temperature flexibility, reduce bleeding, increase viscosity and otherwise improve the product. To accomplish this economically, however, has required that the elastomer be introduced into the petroleum base product in finely divided form, as a latex, or as a powder, or at least in the form of relatively small particles.

To produce an elastomer powder which will not sinter on storage has required the addition of large amounts of diluents, such as inert fillers, e.g., talc, barytes, or treatment of the rubber, as by prevulcanization, or treatment with resins which coat the particle surfaces. These are either expensive treatments or lead to undesirable additives being incorporated in the ultimate mix. If the rubber is to be introduced in the form of larger particles, it would have to be a blend of elastomer and an additive, such as Gilsonite.

We have found that certain blends of synthetic rubbers and resins which do not sinter on storage, when incorporated into petroleum base materials, such as asphalt, produce desirable improvements in properties. The resulting compostion comprises 100 parts by weight of the petroleum base material having dispersed therein 1 to 20 parts by weight of a blend of 40 to 60 parts of a synthetic rubber and correspondingly 60 to 40 parts of a synthetic resin, said synthetic rubber comprising a copolymer of 80 to 50 parts of butadiene and correspondingly 20 to 50 parts of styrene, said synthetic resin comprising a copolymer of 75 to 90 parts of styrene and correspondingly 25 to 10 parts of butadiene. It may be seen that the components of the synthetic resin, namely butadiene and styrene, are the same as the components of the synthetic rubber, although copolymerized in different proportions.

Such rubber-resin blends can be incorporated in petroleum base materials by grinding them into a finely divided form and then dispersing them. Without grinding, which is costly, or the use of very high shear expensive mixers, they do not incorporate readily into liquid bituminous materials, such as asphalt. This would normally be an impediment to their use. However, we have found that by immersing particles of the rubber-resin blend in the liquid bituminous material until the particles swell substantially, and then retaining the swollen particles up against a screen while passing the bituminous material continuously over the particles and through the screen until the shearing force of the bituminous material breaks up the particles to permit them to pass through the screen, we can readily form a homogeneous dispersion of the rubber-resin in the bituminous material.

The drawing is a schematic representation of our method of dispersing such rubber-resin blends in asphalt material.

The rubber-resin blend which we have found desirable for incorporation in petroleum base derivatives is a high styrene, low butadiene synthetic resin masterbatched with a butadiene-styrene synthetic rubber. Specifically, we have found this to be a blend of 40 to 60 parts of a synthetic rubber and, correspondingly, 60 to 40 parts of a synthetic resin. The synthetic rubber comprises a copolymer of 80 to 50 parts of butadiene and correspondingly 20 to 50 parts of styrene. The synthetic resin comprises a copolymer of 75 to 90 parts of styrene and correspondingly 25 to 10 parts of butadiene. Such a blend does not sinter on storage and once the masterbatch is made, no further mixing or blending with other materials is needed prior to the incorporation in the petroleum base material. The term "masterbatch" as used for the rubber-resin blend means that the synthetic rubber and the synthetic resin are combined either by coprecipitation, milling or by the use of a Banbury mixer. Specifically, the means of preparing the masterbatch prior to its incorporation in the petroleum base material include: coprecipitated-extruded material; coprecipitated - extruded material ground using liquid carbon dioxide; Banbury-chopped material; Banbury-ground material; milled-chopped material; and milled-ground material.

The size of the particles in the rubber-resin masterbatch can range from a ground powder to an extruded and chopped particle an inch in diameter. It is emphasized that the rubber-resin blend is introduced into the petroleum base material as a pure polymer, with no fillers or other additives used.

Although this optimum rubber-resin blend can be incorporated in petroleum base materials, such as bituminous materials, e.g., asphalt, by finely grinding the material and dispersing it in the petroleum base material, the drawing represents schematically our improved method of dispersing the rubber-resin blend. A bituminous material, such as asphalt, is placed in tank 10 and held at a temperature of between 300 and 350° F. The hot asphalt is withdrawn from tank 10 through line 11 by pump 12 and circulated through a pre-blend tank 13, valves 14 and 15 being closed.

Rubber-resin material in the form above described is "wetted out" by adding it to the asphalt in pre-blend tank 13 and mixed in with mixer 16. After the complete addition of the polymer material, valve 17 is closed and the mixture is withdrawn from pre-blend tank 13. Valve 18 is then closed, thereby cutting off the pre-blend tank. The rubber-resin blend is thus completely "wetted out," that is, each particle is completely coated with asphalt.

The polymer material, having been completely immersed in the asphalt, is then permitted to swell. Swelling occurs because the polymer material is able to absorb the lighter fractions of the petroleum base material. Each particle of the rubber-resin blend becomes swollen to a size substantially greater than its initial size. To accomplish this the asphalt and polymer mixture is circulated through tank 10 and lines 19, 20, 21 and 22, valves 25 and 26 being shut off. Alternatively, the mixture may be simply stirred during the period necessary to achieve the requisite degree of swelling. The temperature, however, should be kept at between 300 and 350° F. during this period. We have found that the individual particles of the rubber-resin blend should be permitted to swell to between 2 and 10 times their original size. A period of between 2 and 10 hours is usually necessary for this to happen.

Upon completion of this step, the polymer particles will be soft. A small amount of the mixture is withdrawn through outlet 29, by opening valve 30. The individual particles are sufficiently swollen when they shear easily under a small amount of pressure.

After the swell phase is completed, valve 31 is closed and valves 25 and 26 are opened. The mixture of asphalt and swollen polymer particles is then passed through a sieve, screen, strainer or similar device, of which the filter 35 illustrated is but one example. The purpose of using the filter or sieve is to retain the swollen particles of the rubber-resin blend up against the filter screen while passing the asphalt material continuously over the particles and through the screen until the shearing force of the bituminous material is able to break up the particles to a size that will permit them to pass through the screen and thereby form a homogeneous dispersion of the rubber-resin blend in the bituminous material. Thus, the swollen polymer particles are actually dispersed by the hydraulic shearing action of the hot petroleum base material as it passes over them while they are held fixed by the sieve or filter screen. Generally, between 5 and 15 hours are required to effect complete dispersion. The fineness of the dispersion of the polymer in the petroleum base material is dependent upon the size of the opening in the sieve. Openings of from 10 to 100 mesh have been used, with an opening of 60 mesh being the most desirable for ease in dispersion. Filter 35 should be able to withstand a minimum of 150 p.s.i. pressure differential across its inlet-outlet.

Where large (e.g., 1 inch diameter) particles of rubber-resin are used initially, it may be found desirable to pass the mixture through a graduated series of filters to achieve the desired degree of dispersion. Thus, for example, the initial size of screen used may be a 20 mesh filter, being changed to a 40 mesh filter after a period of time, and ultimately to a 60 mesh filter to achieve the final dispersion. Filters having quick-disconnecting elements are commercially available and are well adapted for this particular use. Additionally, depending on the volume of asphalt and polymer material to be circulated through, a series of filters in parallel may be used as shown in the drawing.

The time needed to complete the shear of the swollen polymer particles depends on the storage tank capacity as well as on the speed and capacity of the circulating pump. The dispersion is tested by viscosity measurements until a constant reading at a constant temperature is achieved. At this point the dispersion is complete.

The products obtained according to the process of this invention are useful in road paving materials, waxes, kerosene, fuel oil or the like, that is, in any petroleum base material where a smooth dispersion of polymer is required.

The amount of polymer contained in the bitminous material depends upon its final use. For example, paving blends ordinarily are made to contain 3% of polymer by weight. Other petroleum base materials sometimes contain as much as 15% or more of polymer. Some surfacings can contain up to 20% of polymer by weight. Thus, the invention is ordinarily employed to incorporate from 1 to 20 parts by weight of the polymer in the petroleum base material.

*Example*

A rubber-resin blend was prepared from 44 parts of a synthetic rubber and correspondingly 56 parts of a synthetic resin. The synthetic rubber contained 76.5 parts of butadiene and 23.5 parts styrene. The synthetic resin contained 80 parts of styrene and 20 parts of butadiene.

A storage tank was charged with 40,250 gallons (322,000 pounds) of 105 penetration California asphalt, viscosity 1100 centipoises. A 200-gallon turbo-mixer was used as the "wetting out" or pre-blend tank. A 4-inch portable geared positive displacement pump capable of pumping 300 gallons per minute was used to circulate the asphalt, while 9660 pounds (3% by weight) of the rubber-resin blend was added to the pre-blend tank during a two-hour period. While the polymer material was being added, the asphalt was circulated through the pre-blend tank and back into the storage tank. No screens or sieves, of course, were used at this time.

After the polymer was added to the pre-blend tank, the same was cut out of the circulating line. The mixture was then circulated for two hours at a temperature of between 350 and 360° F. This was the "swell" period. The filter was cut out of the line during this period also.

The particles being sufficiently swollen, three quick-coupling straight-through steel filters mounted in parallel were cut into the line and the mixture was circulated therethrough as follows:

2 hours through a 20-mesh screen;
2 hours through a 40-inch screen; and finally
2 hours through a 60-mesh screen.

The final viscosity of the dispersion ranged from 1800 to 2000 centipoises using a Brookfield viscometer, with a penetration reading of 82–84 mm.

As will be evident to those skilled in the art, various modifications of this invention can be made or followed in the light of the foregoing disclosure and discussion without departing from the spirit or scope of the disclosure or from the scope of the claims.

Having thus described our invention, what we claim and desire to protect by Letters Patent is:

A method of dispersing particles of a rubber composition in liquid asphalt comprising the steps of mixing the rubber composition for a period of from 2 to 10 hours with liquid asphalt at a temperature of from 300° F. to 350° F. to swell the particles of rubber composition to from 2 to 10 times their original size, passing the hot mixture through a screen whereby the swollen particles of rubber composition are retained against the screen, recirculating the liquid asphalt through the screen for a period of from 5 to 15 hours until the shearing force of the asphalt breaks up the swollen particles of the rubber composition to permit the same to pass through the screen and to become homogeneously dispersed in the asphalt, said rubber composition comprising a blend of from 40 to 60 parts of synthetic rubber and correspondingly 60 to 40 parts of synthetic resin, said synthetic rubber comprising a copolymer of 80 to 50 parts of butadiene and correspondingly 20 to 50 parts of styrene, said synthetic resin comprising a copolymer of 75 to 90 parts of styrene and correspondingly 25 to 10 parts of butadiene.

References Cited by the Examiner

UNITED STATES PATENTS

| | | | |
|---|---|---|---|
| 2,477,316 | 7/1949 | Sparks et al. | 260—28.5 |
| 2,638,462 | 5/1953 | Borders | 260—45.5 |
| 2,691,621 | 10/1954 | Gagle | 106—273 |
| 2,841,060 | 7/1958 | Coppage | 260—28.5 |

OTHER REFERENCES

Abraham: "Asphalts and Allied Substances," Fifth edition, D. Van Nostrand Company, Inc., New York, 1945, pages 844–846.

MORRIS LIEBMAN, *Primary Examiner.*

MILTON STERMAN, *Examiner.*